United States Patent
Charles et al.

[11] Patent Number: 5,180,186
[45] Date of Patent: Jan. 19, 1993

[54] STRUT AND METHOD FOR STEER-SENSITIVE DAMPING

[75] Inventors: Harlan W. Charles, Detroit; Larry D. Miller, Rochester Hills, both of Mich.

[73] Assignee: General Motors Corporation, Detroit, Mich.

[21] Appl. No.: 790,993

[22] Filed: Nov. 12, 1991

[51] Int. Cl.$^5$ .............................. B60G 11/26
[52] U.S. Cl. .................. 280/714; 188/299; 188/319; 280/772
[58] Field of Search ............ 280/772, 672, 703, 707, 280/714; 188/319, 322.13, 322.14, 322.15, 299

[56] References Cited

U.S. PATENT DOCUMENTS

| | | | |
|---|---|---|---|
| 3,827,538 | 8/1974 | Morgan | 188/319 |
| 4,520,908 | 6/1985 | Carpenter | 188/319 |
| 4,685,545 | 8/1987 | Fannin et al. | 188/299 |
| 4,757,884 | 7/1988 | Fannin et al. | 188/319 |
| 4,779,560 | 10/1988 | Patrick et al. | 188/322.11 |
| 4,789,051 | 12/1988 | Kruckemeyer et al. | 188/299 |
| 4,800,994 | 1/1989 | Imaizumi et al. | 188/319 |
| 4,800,995 | 1/1989 | Bernhardt et al. | 188/319 |
| 4,821,851 | 4/1989 | Kruckemeier et al. | 188/319 |
| 4,826,205 | 5/1989 | Kouda et al. | 280/703 |
| 4,826,207 | 5/1989 | Yoshioka et al. | 280/714 |
| 4,854,429 | 8/1989 | Casey | 188/299 |
| 4,948,163 | 8/1990 | Kikushima et al. | 280/707 |
| 4,974,707 | 12/1990 | Neumann et al. | 188/299 |
| 5,035,306 | 7/1991 | Ashiba | 188/299 |

FOREIGN PATENT DOCUMENTS

3737173A1  5/1989  Fed. Rep. of Germany ...... 188/319

Primary Examiner—Kenneth R. Rice
Attorney, Agent, or Firm—A. Michael Tucker

[57] ABSTRACT

A hydraulic damper for use with a vehicular suspension system includes a reciprocating piston rod and piston in an inner cylinder. A piston valving means is carried by the piston and controls the flow of fluid between upper and lower chambers of the inner cylinder. A base valving assembly controls the flow of fluid from the inner cylinder to a reservoir. A slotted control plate is rotationally fixed with resepct to the piston valving assembly in the lower chamber adjacent the base valving assembly. As the vehicle is steered, rotation of the inner cylinder and base valve assembly selectively aligns the slotted control plate to vary flow between the control plate and the base valve assembly, thereby providing steer-sensitive damping.

30 Claims, 2 Drawing Sheets

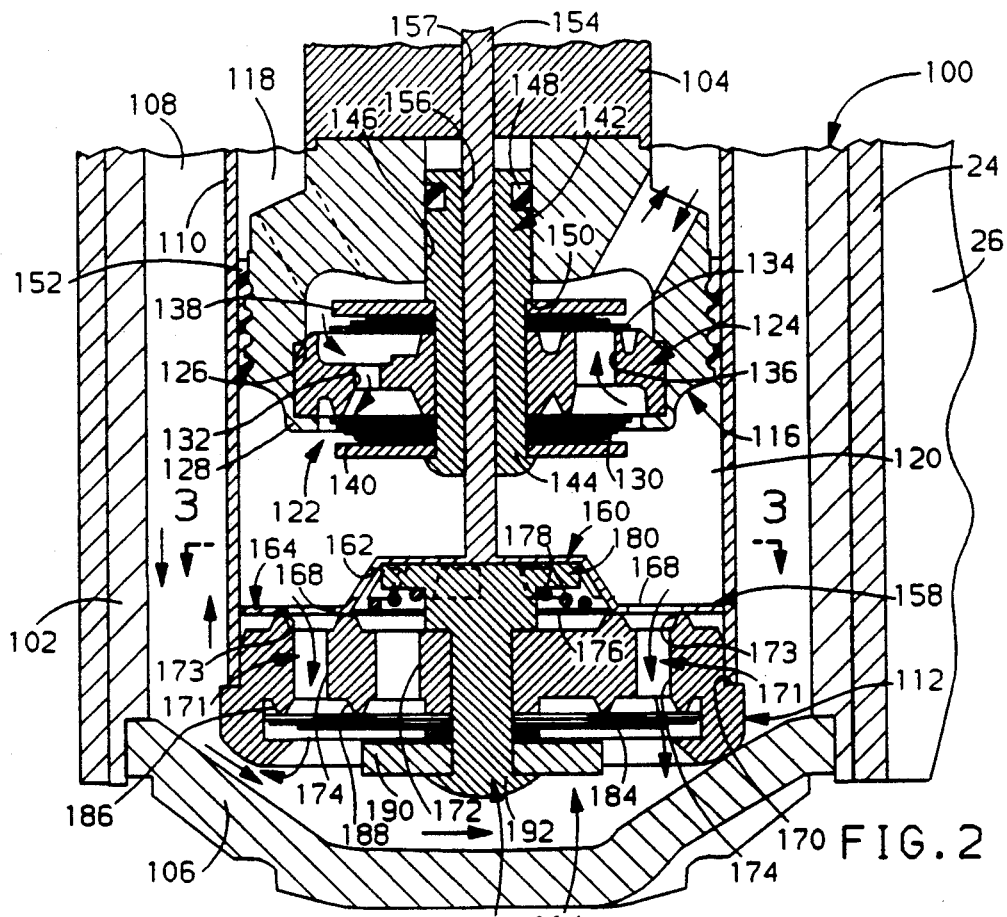
FIG. 2
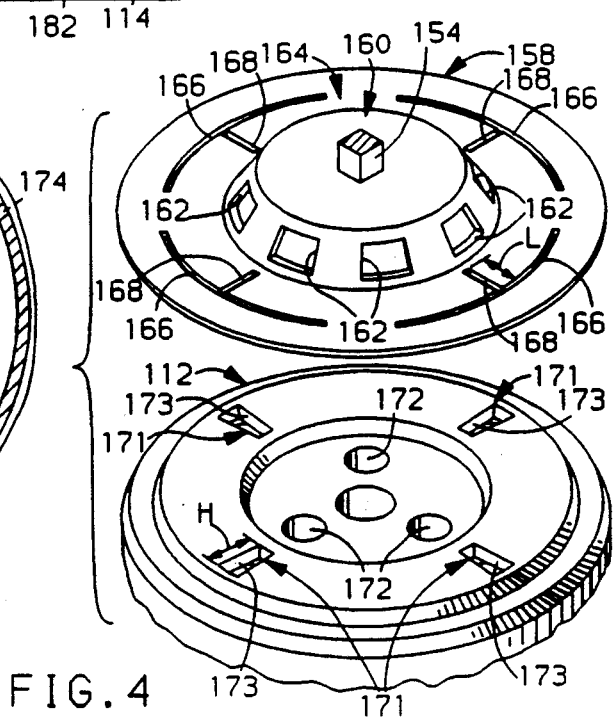
FIG. 3
FIG. 4

STRUT AND METHOD FOR STEER-SENSITIVE DAMPING

CROSS-REFERENCE TO RELATED APPLICATION

The present invention is related to the invention of application Ser. No. 07/558,284, filed Jul. 26, 1990, now U.S. Pat. No. 4,080,205.

BACKGROUND OF THE INVENTION

1. Field of the Invention

The present invention relates generally to hydraulic dampers for vehicular suspension systems. In particular, this invention is concerned with a strut having a reciprocating piston and piston rod mounted in a fluid-filled inner cylinder which provides variable damping dependent upon the rotation of an attached wheel assembly.

2. Brief Description of the Related Art

Hydraulic dampers, including shock absorbers and struts, are well-known in vehicular suspension systems. The rate of damping of a hydraulic strut is often tuned by a piston valving assembly and/or base valve assembly. Conventional piston and base valving assemblies employ various disk packs and spring-biased blow-off elements. During compression and rebound strokes of a strut, fluid flow through these valving assemblies determines the type of damping characteristic produced by the strut.

Many constructions have been developed to provide variable damping. In particular, it is well-known to provide a rotatable plate in a piston valving assembly to change the size of an orifice or other element to alter fluid flow through a piston valving assembly. Oftentimes, an electric motor is used to rotate a valve plate in a piston assembly.

The art continues to seek improvements. It is desirable to provide a variable strut to provide different damping rates for different driving conditions. In particular, during straight-ahead motion of a vehicle, a "soft" ride increases the comfort of passengers. During a steering motion when the vehicle wheels are turned, a "firm" damping rate provides greater control of the vehicle. It is desirable to provide a damper which can vary the damping rate dependent upon these driving conditions.

SUMMARY OF THE INVENTION

The present invention includes a hydraulic damper for use with a vehicular suspension system. The present damper provides variable damping dependent upon the turning motion of an attached wheel assembly. The valving means is an economical system which can be incorporated into conventional shock absorber and strut components. During straight-ahead driving, a soft damping rate is provided. During a turning or cornering motion, firm damping enhances control of the vehicle.

In a preferred embodiment, the present invention includes a hydraulic damper for sue with a vehicular suspension system. The damper includes a reciprocating piston rod and piston in an inner cylinder. A piston valving means is carried by the piston and controls the flow of fluid between upper and lower chambers of the inner cylinder. A base valving assembly controls the flow of fluid from the inner cylinder to a reservoir. A slotted control plate is rotationally fixed with respect to the piston in the lower chamber adjacent the base valving assembly. AS the vehicle is steered, rotation of the inner cylinder and base valve assembly selectively aligns the slotted control plate to vary flow between the control plate and the base valve assembly, thereby providing steer-sensitive damping.

BRIEF DESCRIPTION OF THE DRAWINGS

FIG. 2 is an axial sectional view of a lower portion of the damper of FIG. 1 removed from the suspension system for purposes of clarity of illustration.

FIG. 3 is a sectional view taken along line 3—3 of FIG. 2 illustrating a slotted control plate aligned with a cylinder end having a base valve assembly.

FIG. 4 is a perspective view of the slotted control plate exploded away from an upper surface of the cylinder end wherein the base valving assembly has been removed for purposes of clarity of illustration.

DETAILED DESCRIPTION OF THE DRAWINGS

Figure 1:
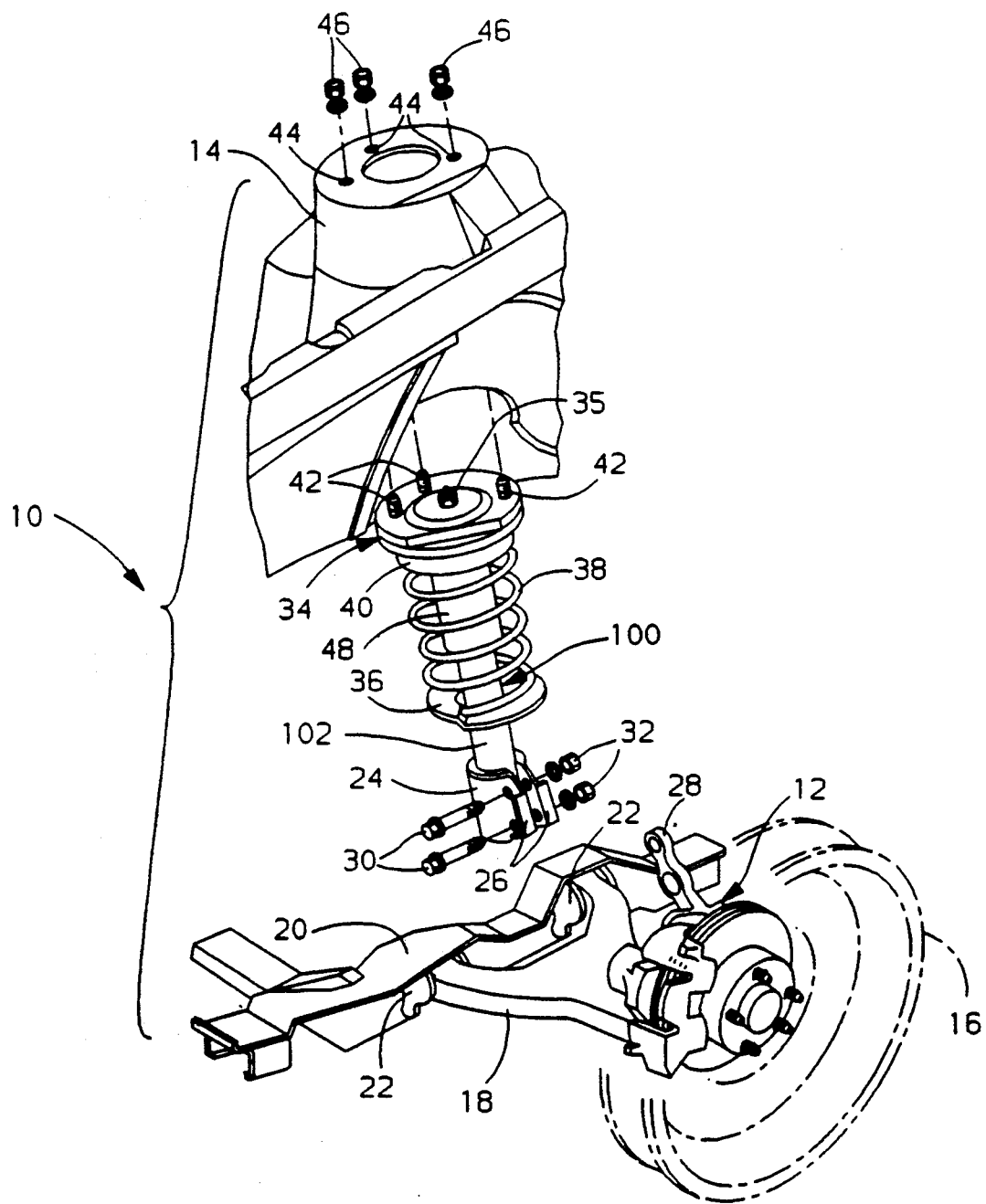
FIG. 1 is an exploded perspective view of an automotive suspension system incorporating a first embodiment of the present steer-sensitive variable damper operatively mounted between a vehicle body and a road wheel assembly.

FIG. 1 illustrates a vehicular suspension system indicated generally at 10. A steerable suspension strut indicated generally at 100 is operatively mounted between a spindle and hub assembly 12 and a mounting tower 14 formed in a vehicular body. The spindle and hub assembly 12 rotatably supports a wheel 16 and is mounted on the outer end of a control arm assembly 18 by a conventional ball joint (not illustrated). The control arm assembly 18 is pivotally mounted at its inboard end to the vehicular frame 20 by pivot shafts 22.

The strut 100 includes a cylindrical reservoir tube 102 mounted at its lower end within a partially cylindrical mounting bracket 24 having radially extending flanges 26 that are spaced from one another in side-by-side relationship to receive an upstanding arm 28 of the spindle and hub assembly 12. Threaded fasteners 30 extend through aligned openings in the mounting bracket flanges 26 and arm 28 and receive nuts 32 to secure the reservoir tube 102 in the mounting bracket 24.

A piston rod 104 telescopically projects from an upper end of the reservoir tube 102 into attachment with a strut mounting assembly 34 and is secured thereto by a nut 35 threaded on the end of the piston rod 104. A particular strut mounting assembly suitable for this application is disclosed in U.S. Pat. No. 4,256,292 issued Mar. 17, 1981 and titled "Resilient Mount For MacPherson Strut." U.S. Pat. No. 4,256,292 is assigned to the present assignee and hereby incorporated by reference.

A lower spring seat 36 is secured to the reservoir tube 102 and mounts a lower end of a helical suspension spring 38. The upper end of the suspension spring 38 is mounted on an upper spring seat 40 of the strut mounting assembly 34. Attachment bolts 42 project upwardly form the strut mounting assembly 34 through complementary openings 44 in the mounting tower 14 to receive nuts 46 which secure the strut mounting assembly 34 to the vehicular body. A cylindrical dust shield 48 is secured to the strut mounting assembly 34 and covers the extended portion of the piston rod 104.

The strut mounting assembly 34 permits the rotation of the reservoir tube 102 with the spindle and hub assembly 12 in a conventional manner whenever the wheel 16 is turned to steer the vehicle. Concurrently, the piston rod 104 is secured to the strut mounting assembly 34 by the nut 36 and remains fixed relative to the vehicular body, thereby resulting in relative rotational motion between the reservoir tube 102 and the piston rod 104.

The lower portion of the strut 100 is illustrated in FIG. 2 and removed from the suspension system 10 of FIG. 1 for purposes of clarity of illustration. As described above, the strut 100 includes the cylindrical reservoir tube 102 mounted in the partially cylindrical bracket 24. A base cup 106 is welded to and closes the lower end of the reservoir tube 102. The reservoir tube 102 surrounds and forms a fluid reservoir 108 with an inner cylinder 110. A cylinder end 112, fitted to and closing the inner cylinder 110, is seated in the base cup 106. A base valve assembly 114 is mounted on the cylinder end 112 and controls the flow of fluid passing between the interior volume of the inner cylinder 110 and the reservoir 108 as described below.

A piston indicated generally at 116 is mounted to a lower end of the cylindrical piston rod 104 by any suitable means. The piston 116 divides the interior volume of the inner cylinder 110 into an upper chamber 118 and a lower chamber 120. The piston 116 carries a piston valving assembly 122 to control the flow of fluid between the upper and lower chambers 118,120 as described below. The piston valving assembly 122 includes a cylindrical orifice plate 124 peripherally secured between an inner locator shoulder 126 and a radially inwardly coined annular skirt 128. A lower valve spring disk pack 130 comprised of a series of flat washer-like valve disks of spring steel having decreasing diameters top to bottom is mounted adjacent to a bottom surface of the orifice plate 124 to deflect downwardly in a response to hydraulic fluid traveling through passage 132 during the rebound stroke.

An upper valve spring disk pack 134 similar to disk pack 130 is comprised of a series of flat washer-like valve disks mounted adjacent a top surface of the orifice plate 124. The upper valve spring disk pack 134 deflects in response to hydraulic fluid traveling through passage 136 during the compression stroke. The spring disk packs 130,134 are held in operative position between upper and lower limit plates 138,140 by a centralized mounting connector 142 having a lower coined end 144 engaging the lower limit plate 140. The connector 142 projects downwardly from an axial channel 146 provided in the piston 116. The connector 142 is secured by any suitable means and carriers an O-ring seal 148. An annular step 150 in the connector 142 engages the upper limit plate 138. An annular sealing band 152, preferably formed from polytetrafluoroethylene, is provided around the circumference of the piston 116 and forms a seal against an inner surface of the inner cylinder 110.

A control shaft 154 having a rectangular cross section is received in a central axial opening 156 in the connector 142. The opening 156 has a complementary rectangular cross section and forms a driving fit between the connector 142 and the control shaft 154. The control shaft 154 extends upwardly into a complementary axial opening 157 in the piston rod 104 a sufficient length to accommodate the stroking range of the piston rod 104. A control plate 158 is provided at the lower end of the control shaft 154 adjacent the base valve assembly 114. The control plate 158 is rotatably fixed with respect to the control shaft 154 if desired.

The control plate 158 includes a radially inner, raised dome portion 160 having a plurality of circumferential ports 162. A radially outer plate portion 164 encircles the dome portion 160 and includes a plurality of spaced arcuate slots 166. Preferably, each slot 166 includes a radial leg 168 so as to form a somewhat T-shaped fluid opening. Hydraulic fluid passes through the ports 162 and the slots 166 as described below.

The cylinder end 112 includes a circumferential shoulder 170 press fit onto a lower end of the inner cylinder 110. A plurality of damping ports 171 an a plurality of return ports 172, illustrated best in FIG. 4, are provided through the cylinder end 112. Preferably, each damping port 171 has an upper trapezoidal cross section 173 and a lower circular cross section 174. It is desirable for the height H of each trapezoidal cross section 173 to substantially complement the length L of each respective radial leg 168 of the control plate 158. When assembled, each radial leg 168 is aligned with a respective damping port 171. A valve disk 176 is mounted on an upper surface of the cylinder end 112 and held in place by a spring 178 seated against an upper flanged end 180 of a centralized connector 182. A slotted valve disk pack 184 is provided on annular seats 186,188 on a lower surface of the cylinder 112. A lower limit plate 190 is retained by a lower flanged end 192 of the connector 182.

In operation, the upward and downward motion of the vehicular suspension system 10 due to road inputs results in compression and rebound of the strut 100, and specifically, reciprocation of the piston 116 and the piston rod 104 in the inner cylinder 110. Fluid travels between the upper and lower chambers 118,120 through the piston valving assembly 122 in a well-known manner. During a compression stroke, fluid displaced by the piston rod 104 volume travels from the lower chamber 120 to the reservoir 108 through the control plate 158 and the base valve assembly 114. During a rebound stroke, fluid returns from the reservoir 108 to the lower chamber 120 through the base valve assembly 114 and the control plate 158.

When the vehicle wheels and tires are aligned to provide straight movement of the vehicle, the legs 168 in the slots 166 of the control plate 158 are aligned with the trapezoidal cross sections 173 of the damping ports 171 as illustrated in FIGS. 2 and 3, thereby permitting a relatively greater flow form the lower chamber 120 to the reservoir 108. When the wheels and tires are turned with respect to the body to steer the vehicle, the turning motion is translated through the spindle and hub assembly 12 and the mounting bracket 24 to the reservoir tube 102, the inner cylinder 110 and the cylinder end 112. At such time, the rotation of the cylinder end 112 with respect to the rotationally fixed control plate 158 and piston 116 is such that the legs 168 are no longer aligned with the trapezoidal cross sections 173, thereby reducing flow through the base valve assembly 114. Regardless of the position of the wheels, fluid returns from the reservoir 108 through return ports 172 to deflect the valve disk 176 upwardly to reach the lower chamber 180.

As described above, the present strut 100 provides a two-stage variable damper. The first stage occurs when the legs 168 are aligned with the damping ports 171, thereby permitting a greater flow of fluid and providing for a "soft" damping rate. The second stage occurs when the legs 168 and the ports 171 are not aligned due to the rotation of the cylinder end 112 with respect to the control plate 158. In the second stage, a "firm" damping rate occurs as fluid passes at a restricted rate from the lower chamber 120 to the reservoir 108 only through the arcuate slots 166.

Depending upon the degree of rotation imparted by the spindle and hub assembly 12, a range of damping characteristics can be achieved with the strut 100. For example, slots 166 can be sized to begin restricting fluid flow through the damping ports 171 with as little as 3-5 degrees of rotation of the reservoir tube 102.

The present invention provides an economical variable damper which is sensitive to the steering motion in a wheel assembly without the use of electric actuators and/or sensors. During straight-ahead driving, the damping of the present strut 100 can be tuned to provide a soft and comfortable ride. However, during turning or cornering, when the wheel assembly is rotated, fluid flow through the base valve assembly 114 is restricted, thereby producing a stiffer ride which can improve handling of a vehicle.

Although the present invention has been described with reference to a preferred embodiment, workers skilled in the art will recognize that changes may be made in form and detail without departing from the spirit and scope of the invention.

The embodiments of the invention in whcih an exclusive property or privilege is claimed are defined as follows:

1. A hydraulic damper for controlling the compression and rebound action of a vehicular suspension spring, the damper comprising:
   (a) a reservoir tube connected to a steerable wheel assembly;
   (b) an inner cylinder fixedly mounted within the reservoir tube and cooperating therewith to form a reservoir for a damper fluid contained within the reservoir tube and the inner cylinder;
   (c) base valve means operatively mounted at one end of the inner cylinder for controlling the flow between the inner cylinder and the reservoir tube;
   (d) a piston rod operatively mounted for reciprocating movement in the inner cylinder and extending through an upper end of the damper;
   (e) a piston secured to an inner end of the piston rod and dividing the interior of the inner cylinder into upper and lower chambers, the piston slidably mounted in the inner cylinder for both reciprocable and rotary motion with respect to the inner cylinder;
   (f) piston valving means in the piston establishing a restricted flow path through the piston between the upper and lower chambers during compression and rebound of the damper; and
   (g) control valving means establishing a variable flow between the lower chamber and the base valve means, the control valving means actuated by the relative rotation between the reservoir tube and the piston provided by a steering motion of a vehicle.

2. The damper specified in claim 1 wherein the control valving means comprises:
   (a) a control shaft rotatably fixed to the piston and projecting toward the base valve means; and
   (b) a control plate rotatably fixed to the control shaft having slot means;
   whereby rotation of the reservoir tube, the inner cylinder and the base valve means selectively aligns the slot means with the base valve means to vary fluid flow.

3. The damper specified in claim 2 wherein:
   (a) the base valve means includes a plurality of damping ports for guiding fluid from the lower chamber to the reservoir; and
   (b) the slot means includes a respective plurality of arcuate slots aligned with the damping ports.

4. The damper specified in claim 3 wherein each slot includes a radial leg.

5. The damper specified in claim 4 wherein a radial dimension of each leg is substantially equal to a radial dimension of a respective damping port.

6. The damper specified in claim 2 wherein the control shaft and the control plate are integrally formed.

7. A system for controlling the compression and rebound action of a vehicular suspension spring with a variable hydraulic damper, the system comprising:
   (a) a reservoir tube;
   (b) a fluid-filled cylinder fixedly mounted within the reservoir tube and cooperating therewith to form a fluid reservoir;
   (c) base valve means mounted at one end of the cylinder for controlling fluid flow between the cylinder and the reservoir tube;
   (d) a piston slidably mounted in the cylinder for both reciprocable and rotary motions and dividing the interior of the cylinder into upper and lower chambers;
   (e) a piston rod rotatably connected at one end to the piston rod and extending form the reservoir tube;
   (f) means for rotating the cylinder along its axis in response to a steering input to the vehicle;
   (g) means for rotatably fixing the piston rod to the vehicle; and
   (h) control valving means establishing a variable flow from the lower chamber to the base valve means, the control valving means rotatably fixed to the piston, wherein the area of aperture means provided in the control valving means is opened and closed by the relative rotation between the control valve means and the base valve means in response to a steering input to the vehicle.

8. The system specified in claim 7 wherein the control valving means comprises:
   (a) a control shaft rotationally fixed with respect to the piston; and
   (b) a slotted control plate rotatably fixed to the control shaft adjacent the base valve means.

9. Control valve means for varying the damping of a hydraulic suspension damper in response to axial rotation of the damper, the damper including a reservoir tube, an inner cylinder connected to the reservoir tube, a piston reciprocally and rotatably mounted in the inner cylinder, a piston rod secured to the piston and fixed to a vehicular body, piston valving means for providing a restricted flow through the piston, and base valve means mounted to the inner cylinder for providing a restricted flow from the inner cylinder to a reservoir, the control valve means comprising:
   (a) a control shaft rotatably fixed to the piston; and
   (b) a control plate adjacent the base valve means, rotatably fixed to the control shaft, having a plurality o slots selectively alignable with the base valve means as the damper is rotated along its axis.

10. The control valve means specified in claim 9 wherein a driving fit is provided between the control shaft and the piston.

11. The control valve means specified in claim 9 wherein the control shaft has a rectangular cross section.

12. The control valve means specified in claim 9 wherein each slot includes an arcuate portion and a radial leg.

13. The control valve means specified in claim 12 wherein the base valve means includes a plurality of respective damping ports aligned with each radial leg.

14. The control valve means specified in claim 13 wherein the damping ports include an upper trapezoidal cross section and a lower circular cross section.

15. A steer-sensitive valve for varying the damping of a steerable suspension strut having base valve means for controlling hydraulic fluid flow between an inner cylinder and a reservoir, the steer-sensitive valve comprising:
   (a) a shaft rotatably fixed to a piston of the strut; and
   (b) a plate rotatably fixed to a shaft adjacent the base valve means and including a plurality of slots selectively alignable with the base valve means as the strut is rotated during a steering motion of a wheel assembly.

16. The steer-sensitive valve specified in claim 15 wherein a driving fit is provided between the control shaft and the piston.

17. The steer-sensitive valve specified in claim 15 wherein the control shaft has a rectangular cross section.

18. The steer-sensitive valve specified in claim 15 wherein each slot includes an arcuate portion and a radial leg.

19. The steer-sensitive valve specified in claim 18 wherein the base valve means includes a plurality of respective damping ports aligned with each radial leg.

20. The steer-sensitive valve specified in claim 19 wherein the damping ports include an upper trapezoidal cross section and a lower circular cross section.

21. A method for varying the damping force of a hydraulic damper in a vehicular suspension system as a vehicle is steered, the damper of the type having a fluid-filled cylinder divided into upper and lower chambers by a reciprocable piston slidably mounted in the cylinder, the method comprising the steps of:
   (a) rotatably fixing the piston to the vehicle;
   (b) rotatably fixing the cylinder to a steerable wheel assembly;
   (c) rotatably fixing base valve means to the cylinder for controlling fluid flow between the lower chamber and a reservoir;
   (d) rotatably fixing control valve means to the piston in the lower chamber adjacent the base valve means; and
   (e) rotating the wheel assembly to selectively align the control valve means with the base valve means, thereby varying fluid flow between the control valve mans and the base valve means.

22. The method specified in claim 21 wherein the wheel assembly is rotated by steering the vehicle.

23. The method specified in claim 21 wherein:
   (a) the cylinder is mounted in a reservoir tube attached to the wheel assembly; and
   (b) the reservoir is formed between the reservoir tube and the cylinder.

24. A method for varying damping of a sprung vehicle in a suspension system, the method comprising the steps of:
   (a) installing a hydraulic damper between sprung and unsprung portions of a vehicle, the damper including a fluid-filled cylinder;
   (b) attaching a first element of the damper to a steerable wheel assembly;
   (c) dividing an interior of the cylinder into upper and lower chambers with a reciprocable and rotatable piston;
   (d) rotatably fixing the piston to a sprung portion of the vehicle;
   (e) restricting fluid flow through internal passage mans in the piston with a piston valving assembly;
   (f) rotatably fixing base valve means to the cylinder for controlling fluid flow between the lower chamber and a reservoir;
   (g) rotatably fixing control valve mans having slots to the piston in the lower chamber adjacent the base valve means; and
   (h) rotating the wheel assembly to selectively align the slots of the control valve mans with the base valve means to vary fluid flow through the base valve means.

25. The method specified in claim 24 including the step of fixedly connecting the cylinder to a steerable wheel assembly.

26. The method specified in claim 24 wherein the cylinder is mounted in a reservoir tube attached to the wheel assembly and the reservoir is formed between the cylinder and the reservoir tube.

27. A method of varying fluid flow in a steerable hydraulic damper of a vehicular suspension system, the method comprising the steps of:
   (a) providing a fluid-filled cylinder;
   (b) dividing an interior of the cylinder into first and second chambers with a piston slidably mounted in cylinder;
   (c) fixedly connecting a first end of a piston rod to the piston and fixedly connecting a second end of the piston rod to a vehicle;
   (d) restricting fluid flow through the piston between the first and second chambers with piston valving means;
   (e) establishing a variable flow between the second chambers and the base valve means with a control plate rotationally fixed with respect to the piston;
   (f) rotating the cylinder as the vehicle is steered to selectively align the control plate with the base valve means to vary flow.

28. The method specified in claim 27 wherein slots are provided in the control plate for alignment with damping ports in the base valve means.

29. A method of using a hydraulic damper in a vehicular suspension system, the method comprising the steps of:
   (a) mounting the damper having a fluid-filled cylinder mounting a reciprocable piston between sprung and unsprung portions of a vehicle;
   (b) rotatably fixing the piston to the sprung portion of the vehicle;
   (c) rotatably fixing the cylinder to the unsprung portion of the vehicle;
   (d) providing first and second fluid chambers in the cylinder separated by the piston;
   (e) restricting fluid flow between the second fluid chamber and a reservoir as the piston reciprocates with a base valve means rotatably fixed to the cylinder;
   (f) providing variable fluid flow between the second fluid chamber and a reservoir with a slotted control plate rotatably fixed to the piston; and
   (g) rotating the cylinder to selectively align the slotted control plate with the base valve means to provide variable damping form the damper.

30. The method specified in claim 29 wherein the cylinder is rotated as a wheel assembly is steered.

* * * * *